Aug. 12, 1947.   J. A. OBERMAIER   2,425,557
PYROMETER
Filed April 10, 1943   3 Sheets-Sheet 2
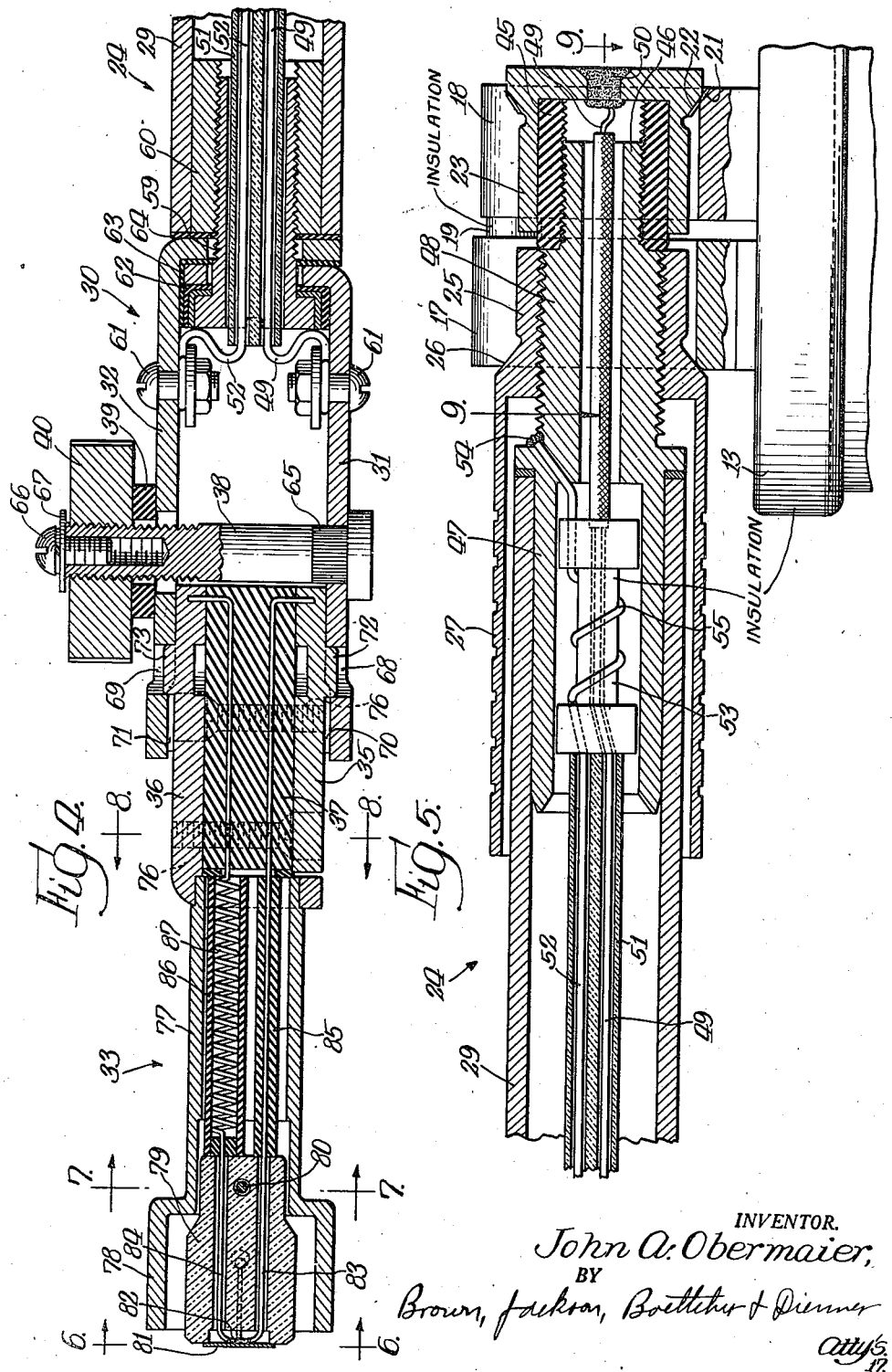
INVENTOR.
John A. Obermaier,
BY
Brown, Jackson, Boettcher & Dienner
Atty's Aug. 12, 1947.  J. A. OBERMAIER  2,425,557
PYROMETER
Filed April 10, 1943  3 Sheets-Sheet 3
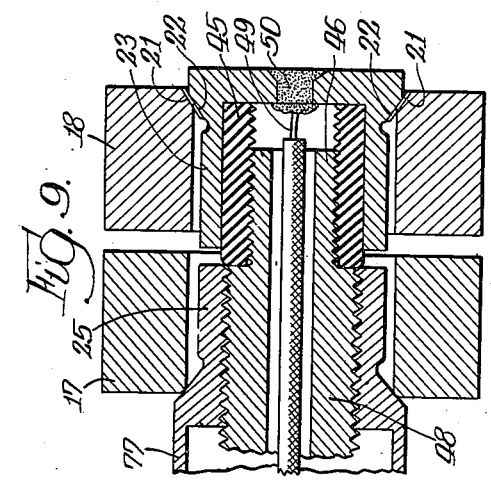
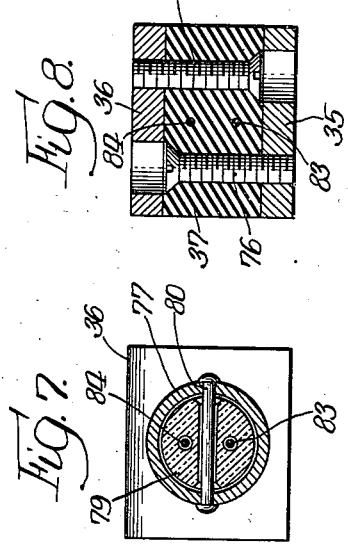
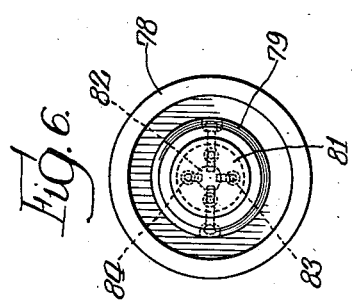
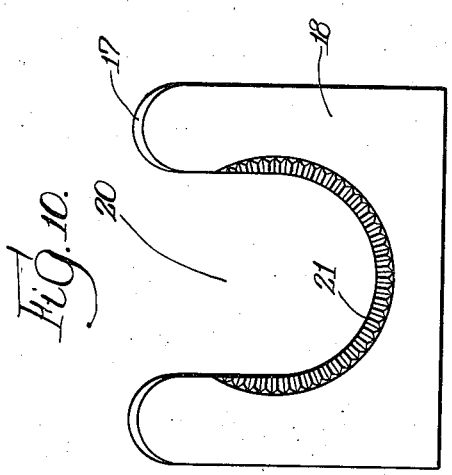
INVENTOR.
John A. Obermaier,
BY
Brown, Jackson, Boettcher & Dienner.
Atty's.

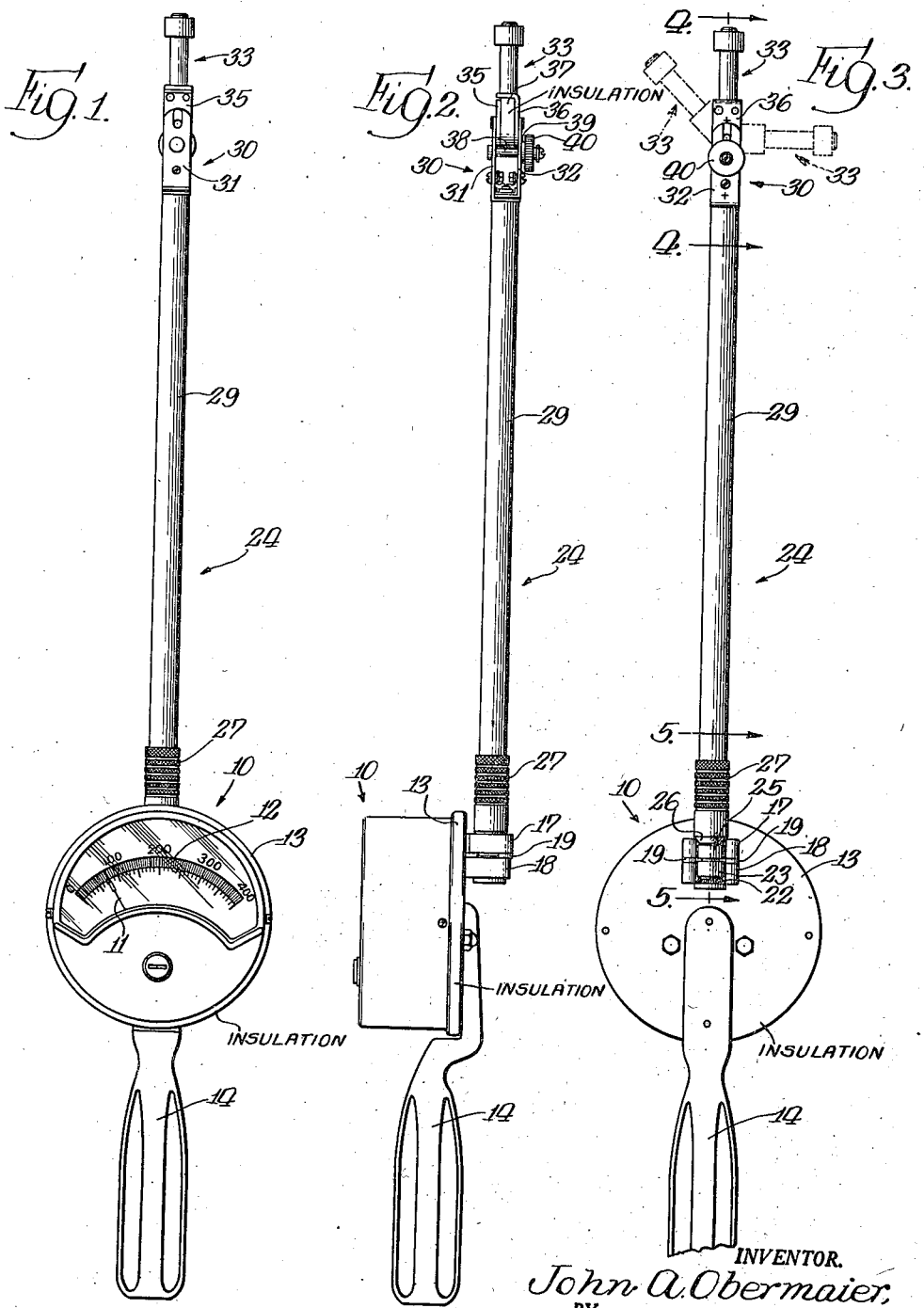

Patented Aug. 12, 1947

2,425,557

UNITED STATES PATENT OFFICE 2,425,557

PYROMETER

John A. Obermaier, River Forest, Ill.

Application April 10, 1943, Serial No. 482,632

12 Claims. (Cl. 173—328)

1

My invention relates, generally, to electric measuring devices and it has particular relation to pyrometers.

The present invention has to do with improvements over the pyrometer construction disclosed in my Patent No. 2,285,457, in my copending application Serial No. 446,044, filed June 6, 1942, and my copending application Serial No. 446,045, filed June 6, 1942. The present invention also relates to the invention disclosed in my copending application Serial No. 482,631, filed April 10, 1943, now patent No. 2,397,975, issued April 9, 1946, relating particularly to the manner in which the measuring instrument is mounted in its carrying case and a particular form of extension for mounting the thermo-couple and connecting it to the instrument.

An object of the present invention is to provide for quickly and efficiently connecting the extension arm with its terminals to the terminals of the measuring instrument, the extension arm carrying a thermo-couple and the instrument indicating the temperature at the thermo-couple.

Another object of the present invention is to provide simple and efficient means for mounting the thermo-couple on the extension which readily permits its being placed in operative position and removed therefrom without requiring the use of any tool such as a screw driver or wrench.

Other objects of my invention will, in part, be obvious and in part appear hereinafter.

For a more complete understanding of the nature and scope of my invention reference can be had to the following detailed description taken in connection with the accompanying drawings in which:

Figure 1 is a top plan view of a pyrometer including a measuring instrument of the D'Arsonval type having an extension mounted thereon in accordance with the present invention and carrying a thermo-couple on the extension in accordance with the present invention;

Figure 2 is a view, in side elevation, of the pyrometer shown in Figure 1;

Figure 3 is a view, in bottom plan, of the pyrometer as shown in Figure 1 and also illustrating by broken lines different positions which the thermo-couple may assume;

Figure 4 is a cross sectional view, at an enlarged scale, taken along the line 4—4 of Figure 3;

Figure 5 is a cross sectional view, at an enlarged scale, taken along the line 5—5 of Figure 3;

2

Figure 6 is a view, in end elevation, taken along the line 6—6 of Figure 4;

Figure 7 is a detail sectional view taken along the line 7—7 of Figure 4;

Figure 8 is a detail sectional view taken along the line 8—8 of Figure 4;

Figure 9 is a detail sectional view taken along the line 9—9 of Figure 5; and

Figure 10 is a view, at an enlarged scale, in end elevation of the terminal blocks mounted on the back of the instrument case.

Referring now particularly to Figures 1, 2 and 3 of the drawings, it will be observed that the reference character 10 designates, generally a measuring instrument, preferably of the D'Arsonval type, which is provided with the conventional pointer 11 arranged to be operated by a moving coil relative to a scale 12 which is suitably calibrated to indicate temperature as will be readily understood. The instrument 10 includes a case 13 to which is attached a handle 14 to permit holding the instrument 10 by the hand of an operator in a position where the scale 12 is readily visible.

On the rear of the case 13 there are provided terminal blocks 17 and 18 which, it will be understood, are connected to the moving coil of the instrument 10 and permit external connection thereto from a thermo-couple which is applied to the body or material whose temperature is to be measured. The terminal blocks 17 and 18 are positioned close together and are spaced apart slightly by insulating washers 19, as shown in Figures 2 and 3 of the drawings.

As shown in Figure 10 of the drawings, each of the terminal blocks 17 and 18 is provided with a U-shaped centrally located opening 20. These U-shaped openings 20 are accurately aligned. The outer end portion of the U-shaped opening 20 in the terminal block 18 is serrated, as indicated at 21, for cooperating with a correspondingly serrated flange 22 integrally formed with a cylindrical terminal 23, which is adapted to loosely fit in the U-shaped opening 20 of the terminal block 18.

The terminal 23 constitutes one terminal of an extension, shown generally at 24, for permitting connection thereof to the instrument 10. Another terminal 25, cylindrical in shape, serves as another terminal for the extension 24 for connecting it to the instrument 10. Integrally formed with the terminal 25 is a flanged portion 26 which is arranged, as shown in Figure 3 of the drawings, to bear against the outer end portion of the U-shaped opening in the terminal block 17. The terminal 25 is further provided with an integrally formed knurled sleeve portion 27 which is arranged, as will be set forth hereinafter, to facilitate rotation and clamping the flanges 22 and 26 to the terminal blocks 17 and 18 so as to provide good mechanical and electrical contact engagement therewith.

In the embodiments of the invention shown in the drawings, the extension 24 includes a rigid metallic tubular member 29 which carries at its outer end a yoke, shown generally at 30. The yoke 30 comprises a pair of spaced apart terminal plates 31 and 32 which constitute outer end terminals for the extension 24. It will be observed that the terminal plates 31 and 32 are in the form of L-shaped brackets, the inturned lower end portions being insulated from each other and facilitating the mounting of the yoke 30 on the outer end of the tube 29.

The yoke 30 is provided for receiving different types of thermo-couples, the type used being determined by the size and character of the body or material whose temperature is to be measured. For illustrative purposes, a thermo-couple, shown generally at 33, is illustrated. This particular thermo-couple 33 includes a pair of terminal plates 35 and 36 which are spaced apart by a suitable insulating spacer 37. The terminal plates 35 and 36 constitute the terminals of the thermo-couple 33 and are arranged to have good mechanical and electrical contact engagement with the terminal plates 31 and 32, respectively, of the yoke 30.

The terminal plates 31 and 32 are somewhat resilient in character and tend to spread apart so as to facilitate insertion of the terminal plates 35 and 36 of the thermo-couple 33 therebetween. With a view to clamping the terminal plates 31 and 32 into intimate contact engagement with the terminal plates 35 and 36, a threaded pin 38 is provided and extends through both of the terminal plates 31 and 32. The pin 38 is secured to the plate 31 and passes through a relatively large aperture in the plate 32 from which it is insulated by a washer 39 of suitable insulating material. A thumb nut 40 is threaded on the end of the pin 38 projecting beyond the terminal plate 32. When the thumb nut 40 is tightened, the terminal plates 31 and 32 are clamped in intimate contact engagement with the terminal plates 35 and 36. However, the construction is such that the thermo-couple 33 can be swung to various positions, as shown in Figure 3 of the drawings, depending upon the location of the body or material whose temperature is to be measured.

The construction of the yoke 30 with the clamp pin 38 and thumb nut 40 permits ready substitution of another thermocouple without requiring the use of any special tool such as a screw driver or wrench. All that is required to substitute another thermo-couple for the thermo-couple 33, for example, is that the thumb nut 40 be loosened a sufficient extent to permit the terminal plates 31 and 32 to spring apart far enough to permit withdrawal of the thermo-couple 33. Another thermo-couple can then be substituted and the thumb nut 40 tightened to hold it securely in place.

In Figure 5 of the drawings the details of construction for clamping the extension 24 to the terminal blocks 17 and 18 are more clearly shown. It will be observed that the cylindrical terminal 23 is mounted on a bushing 45 of a suitable insulating material and has a press fit therewith.

The bushing 45 is threaded onto a reduced threaded end portion 46 of a tubular metallic fitting 47, which has a press fit with the adjacent end of the metallic sleeve 29. The fitting 47 is provided with an intermediate threaded portion 48 on which the terminal 25 is threaded. It will now be apparent that when the terminal 25 is rotated by rotating the knurled extension 27, the shoulder 26 is moved toward or away from the serrated shoulder or flange 22 of the terminal 23 depending upon the direction of rotation of the terminal 25. Thus the flanges 22 and 26 can be moved into or out of engagement with the respective adjacent portions of the terminal blocks 17 and 18 to provide intimate contact engagement therewith or to provide disengagement therefrom as the case may be.

A conductor 49 is connected, as shown, to the terminal 23 by being soldered thereto as indicated at 50. The conductor 49 extends through a suitable ceramic insulating tube 51 which effectively insulates it from the metallic tube 29. A second conductor 52 extends over an insulating spool 53 inside of the body of the fitting 47 and through a suitable aperture in the fitting 47. It is secured thereto by suitable means such as solder as indicated at 54. The portion 55 of the conductor 52 extending around the spool 53 is provided for calibrating purposes. It will be understood that the resistance of the thermo-couple circuit including the conductors 49 and 52 is of great importance and that it must be provided at a predetermined value in order to interchangeably use various types of thermo-couples and still use the same calibration for the instrument 10. Because of this an excess of the conductor 52 may be provided, as indicated by the portion 55, and then a certain part of this excess may be removed in order to provide the desired resistance. The balance of the portion 55 remaining is wound on the spool 53 substantially as indicated.

The construction and details of the yoke 30 and the manner in which the thermo-couple 33 is mounted therein are clearly shown in Figures 4, 6, 7 and 8 of the drawings. It will be observed in Figure 4 that the conductors 49 and 52 extend through the ceramic tube 51 which in turn extends through a fitting 59 that is threaded into a bushing 60 having a press fit with the metallic tube 29. Screws 61 projecting through the terminal plates 31 and 32 serve to securely connect the conductors 49 and 52 thereto. The terminal plates 31 and 32 are insulated from each other and from the metallic tube 29 by suitable insulating pieces 62, 63 and 64. This construction provides for rigidly holding the terminal plates 31 and 32 in place on the outer end of the tube 29.

It will be observed that the pin 38 is knurled, as indicated at 65, where it passes through the terminal plate 31. The pin 38 is pressed into place in the terminal plate 31 so that it is substantially fixed thereto. The screw 66 and washer 67 are provided, as shown, at the outer end of the pin 38 to prevent the thumb nut 40 from being inadvertently screwed off of the pin 38.

Each of the terminal plates 31 and 32 is provided with an aperture 68 and 69, respectively, near its outer end. Grooves 70 and 71 on the inner sides of the terminal plates 31 and 32 terminate in these apertures 68 and 69. The purpose of the grooves 70 and 71 and apertures 68 and 69 is to receive projections 72 and 73, which are in effect upstruck portions of the terminal plates 35 and 36. The grooves 70 and 71 serve to guide the projecting portions 72 and 73 into the apertures 68 and 69. This is readily permitted since the terminal plates 31 and 32 are somewhat resilient and the thumb nut 40 can be unscrewed far enough to permit this to take place. Once the projecting portions 72 and 73 have been placed in the apertures 68 and 69, the thumb nut 40 can be tightened to provide intimate contact engagement between the juxtaposed surfaces of the terminal plates 31 and 35 and 32 and 36. At the same time, the thermo-couple 33 can be swung about the projecting portions 72 and 73 as an axis to occupy different positions as shown in Figure 3 of the drawings.

It will be noted that countersunk screws 76 serve to hold the terminal plates 35 and 36 together through the agency of the insulating spacer 37. The arrangement of the screws 76 is more clearly shown in Figure 8 of the drawings.

A tubular metallic extension 77 is carried by the terminal plate 36 and at its outer end it is enlarged, as indicated at 78, for receiving and protecting a tip 79 of ceramic material. The tip 79 is pivotally mounted on a pin 80 extending transversely through the extension 77 and has a limited pivotal movement with respect thereto. At its outer end the tip 79 carries a plate 81 of suitable material for engagement with the body or material whose temperature is to be measured. The plate 81 is made of various materials depending upon the temperature likely to be encountered. The plate 81 is secured to the hot junction 82 between conductors 83 and 84 which, it will be understood are merely extensions of the conductors 49 and 52 and are made of dissimilar metal as is well known to those skilled in the art. The conductors 83 and 84 extend through suitable tubular insulating members 85 and 86 within the metallic extension 77, and also through the insulating spacer 37 to the terminal plates 35 and 36 to which they are connected, as illustrated in Figure 4. The conductor 84 is provided with a coiled section 87 within the tubular insulating member 86 for the purpose of calibrating the thermo-couple 33 to have the required resistance.

In my copending application Serial No. 482,631, filed April 10, 1943, I have disclosed another form of the extension 24 which, instead of employing a rigid tubular member 29 employs a flexible tubular member between the clamp mechanism for securing the extension 24 to the instrument 10 and the yoke 30. That is, the construction at each end of the flexible tubular member is substantially identical with that shown for the rigid tubular member 29. Within the flexible tubular member there are provided two insulated flexible conductors corresponding to the conductors 49 and 52 described hereinbefore. For some applications the flexible construction provided by this flexible tubular member is preferred to the rigid construction provided by the tubular member 29 shown and described herein.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim as my invention:

1. In a pyrometer, in combination, a measuring instrument, a pair of instrument terminals on said instrument and insulated from each other, extension means having one end adapted for insertion into and removal from said instrument terminals, and a pair of terminals on the adjacent end of said extension means and insulated from each other, one of said last terminals being movable longitudinally along said extension means for clamping the terminals on said extension means in contact with the terminals on the instrument by pressure applied endwise of said extension means.

2. In a pyrometer, in combination, a measuring instrument, a pair of instrument terminals on said instrument and insulated from each other, extension means having one end adapted for insertion into and removal from said instrument terminals, a pair of terminals on the adjacent end of said extension means and insulated from each other, one of said last terminals being movable longitudinally along said extension means for clamping the terminals on said extension means in contact with the terminals on the instrument by pressure applied endwise of said extension means, and a thermocouple on the opposite end of said extension means and adapted to be connected in circuit with said instrument by the endwise clamping contact between the terminals on the extension means and the terminals on the instrument.

3. In a pyrometer, in combination, a measuring instrument, a pair of instrument terminals carried by said instrument in insulated juxtaposed relation and having aligned generally U-shaped openings, extension means having one end adapted to be inserted loosely into the generally U-shaped openings in said terminals and for removal therefrom, and a pair of terminals on the adjacent end of said extension means and insulated from each other, one of said last terminals being movable longitudinally along said extension means for clamping the terminals on said extension means in contact with the terminals on the instrument by pressure applied endwise of said extension means.

4. In a pyrometer, in combination, a measuring instrument, a pair of instrument terminals carried by said instrument in insulated juxtaposed relation and having aligned generally U-shaped openings, extension means having one end adapted to be inserted loosely into the generally U-shaped openings in said terminals and for removal therefrom, a pair of terminals on the adjacent end of said extension means and insulated from each other, one of said last terminals being movable longitudinally along said extension means for clamping the terminals on said extension means in contact with the terminals on the instrument by pressure applied endwise of said extension means, and a thermocouple on the opposite end of said extension means and adapted to be connected in circuit with said instrument by the endwise clamping contact between the terminals on the extension means and the terminals on the instrument.

5. In combination, a tubular member having a threaded extension, a terminal member mounted on said extension and insulated therefrom, a sleeve member in circuit with said threaded extension and having threaded engagement with said extension inwardly of said terminal member to be screwed along said extension toward and away from said terminal member, and generally opposed contact making and clamping abutments on said terminal member and said sleeve member.

6. In combination, a tubular member having a threaded extension, a terminal member mounted on said extension and insulated therefrom, a sleeve member in circuit with said threaded extension and having threaded engagement with said extension inwardly of said terminal member to be screwed along said extension toward and away from said terminal member, generally opposed annular contact making and clamping abutments on said terminal member and said sleeve member, and a pair of insulated conductors extending through said tubular member, one of said conductors being connected in circuit with said extension and the other connected in circuit with said terminal member.

7. In combination, a tubular member having a threaded extension, a terminal member mounted on said extension and insulated therefrom, a sleeve member in circuit with said threaded extension and having threaded engagement with said extension inwardly of said terminal member to be screwed along said extension toward and away from said terminal member, and generally opposed annular contact making and clamping abutments on said terminal member and said sleeve member, the contact making and clamping abutment on said terminal member being serrated.

8. In combination, an instrument, and a pair of terminal members carried by said instrument in insulated juxtaposed relation, said terminal members having aligned and generally U-shaped openings therein for removably receiving a cooperating member, one of said terminal members having a contact portion at one end of the opening therein for contact with a terminal on said cooperating member and the other terminal member having a contact portion at the opposite end of the opening therein for cooperation with another terminal on said cooperating member.

9. In combination, an instrument, and a pair of terminal members carried by said instrument in insulated juxtaposed relation, said terminal members having aligned and generally U-shaped openings therein for removably receiving a cooperating member, one of said terminal members having a contact portion at one end of the opening therein for contact with a terminal on said cooperating member and the other terminal member having a contact portion at the opposite end of the opening therein for cooperation with another terminal on said cooperating member, one of said contact portions being serrated.

10. In a pyrometer, in combination, a measuring instrument, a pair of instrument terminals on said instrument and insulated from each other, extension means having one end adapted for insertion into and removal from said instrument terminals, a pair of terminals on the adjacent end of said extension means and insulated from each other, one of said last terminals being movable longitudinally along said extension means for clamping the terminals on said extension means in contact with the terminals on the instrument by pressure applied endwise of said extension means, and cooperating serrations on one of the terminals on said extension means and on the adjacent instrument terminal.

11. In a pyrometer, in combination, a measuring instrument, instrument terminals carried by said instrument in insulated juxtaposed relation and having aligned generally U-shaped openings, a tubular member having a threaded extension, a terminal member on said extension and insulated therefrom, a sleeve member in circuit with said threaded extension and having threaded engagement with said extension inwardly of said terminal member to be screwed along said extension toward and away from said terminal member, said sleeve member and the terminal on said extension having portions for insertion into and removal from the generally U-shaped openings in the instrument terminals, and generally opposed contact making and clamping abutments one on the terminal member on said extension and another on said sleeve member.

12. In a pyrometer, in combination, a measuring instrument, instrument terminals carried by said instrument in insulated juxtaposed relation and having aligned generally U-shaped openings, a tubular member having a threaded extension, a terminal member on said extension and insulated therefrom, a sleeve member in circuit with said threaded extension and having threaded engagement with said extension inwardly of said terminal member to be screwed along said extension toward and away from said terminal member, said sleeve member and the terminal on said extension having portions for insertion into and removal from the generally U-shaped openings in the instrument terminals, generally opposed contact making and clamping abutments one on the terminal member on said extension and another on said sleeve member, and a pair of insulated conductors extending through said tubular member, one of said conductors being connected in circuit with the terminal member on said extension and the other connected in circuit with said sleeve member.

JOHN A. OBERMAIER.

REFERENCES CITED

The following references are of record in the file of this patent:

UNITED STATES PATENTS

| Number | Name | Date |
|---|---|---|
| 1,936,140 | Obermaier | Nov. 21, 1933 |
| 2,296,322 | Alfery | Sept. 22, 1942 |
| 2,014,288 | Noschang | Sept. 10, 1935 |
| 2,014,853 | Ley et al. | Sept. 17, 1935 |
| 2,284,462 | Williams | May 26, 1942 |
| 2,022,515 | Orchard | Nov. 26, 1935 |
| 2,252,395 | Cohen | Aug. 12, 1941 |
| 2,285,457 | Obermaier | June 9, 1942 |